US012140153B2

(12) United States Patent
Sauerstein

(10) Patent No.: US 12,140,153 B2
(45) Date of Patent: Nov. 12, 2024

(54) COMPRESSOR DEVICE OF A SUPERCHARGING DEVICE FOR AN INTERNAL COMBUSTION ENGINE

(71) Applicant: BorgWarner Inc., Auburn Hills, MI (US)

(72) Inventor: Rolf Sauerstein, Obermoschel (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/318,522

(22) Filed: May 12, 2021

(65) Prior Publication Data

US 2021/0355961 A1 Nov. 18, 2021

(30) Foreign Application Priority Data

May 12, 2020 (DE) ........................ 102020112870.3

(51) Int. Cl.
*F04D 29/42* (2006.01)
*F02B 39/04* (2006.01)
(Continued)

(52) U.S. Cl.
CPC .......... *F04D 29/4213* (2013.01); *F02B 39/04* (2013.01); *F02B 39/10* (2013.01); *F04D 17/10* (2013.01); *F04D 29/441* (2013.01)

(58) Field of Classification Search
CPC .... F04D 29/4213; F04D 17/10; F04D 29/441; F04D 29/684; F04D 25/06; F02B 39/04;
(Continued)

(56) References Cited

U.S. PATENT DOCUMENTS

2006/0060173 A1* 3/2006 Wei ..................... F02B 29/0425 123/568.17
2006/0124116 A1* 6/2006 Bui ........................ F02M 26/10 60/278
(Continued)

FOREIGN PATENT DOCUMENTS

CN 102767538 B 12/2015
CN 105909564 A * 8/2016 .............. F02B 37/04
(Continued)

OTHER PUBLICATIONS

Translation—EP-1789683-B1 (Year: 2023).*
(Continued)

*Primary Examiner* — J. Todd Newton
(74) *Attorney, Agent, or Firm* — Howard & Howard Attorneys PLLC

(57) ABSTRACT

A compressor device of a supercharging device for an internal combustion engine (1), having
- an inlet channel (21) with a side wall (23),
- an exhaust-gas inlet (25) in the side wall (23), at which exhaust-gas inlet an exhaust-gas recirculation channel (27) opens into the inlet channel (21), and
- a flow barrier (29) in the inlet channel (21), which flow barrier at least partially spans the exhaust-gas inlet (25), is spaced apart from the exhaust-gas inlet (25) and is suitable for diverting exhaust gas which flows from the exhaust-gas inlet (25) into the inlet channel (21) at an angle with respect to an axial direction of the inlet channel (21) or with respect to the axis of a compressor (3).

11 Claims, 9 Drawing Sheets

(51) Int. Cl.

| | |
|---|---|
| ***F02B 39/10*** | (2006.01) |
| ***F04D 17/10*** | (2006.01) |
| ***F04D 29/44*** | (2006.01) |

(58) Field of Classification Search
CPC . F02B 39/10; F05D 2220/40; F05D 2240/127
USPC ........................................................ 415/203
See application file for complete search history.

(56) References Cited

U.S. PATENT DOCUMENTS

2007/0271920 A1* 11/2007 Marsal .................. F02M 26/06 60/605.2
2011/0011084 A1* 1/2011 Yanagida .............. F02M 26/21 60/605.2
2012/0023930 A1* 2/2012 Lischer ................. F02M 26/06 60/598
2013/0019592 A1* 1/2013 Tkac .................. F04D 29/4213 415/203
2014/0366533 A1* 12/2014 Shioda ................ F04D 29/5846 60/605.2
2015/0198119 A1* 7/2015 Kuske .................. F02M 26/74 60/605.2
2016/0160804 A1* 6/2016 Dettloff .................. B01F 23/10 123/568.17
2016/0160805 A1* 6/2016 Polcyn .................. F02M 26/70 123/568.18
2016/0201610 A1* 7/2016 Dahl ...................... F02M 26/19 123/568.17
2019/0003401 A1* 1/2019 Vierkotten ............ F02M 26/21
2019/0003402 A1* 1/2019 Vierkotten ............ F02M 26/21
2020/0070077 A1* 3/2020 Rakovec ............... F02B 75/282

FOREIGN PATENT DOCUMENTS

DE 102015119295 A1 * 6/2016 ............ F02M 26/06
EP 1789683 B1 * 6/2010 ........... F01M 13/021
EP 2975269 A1 * 1/2016 ............. F02B 33/40
GB 2504096 A * 1/2014 ................ F02C 6/12
JP 2013238143 A * 11/2013
JP WO2014170954 A1 * 10/2014 ............. F02B 39/00
JP 2015105644 A * 6/2015
JP 2020084874 A * 6/2020
WO WO-2012066979 A1 * 5/2012 ......... F02M 25/0709

OTHER PUBLICATIONS

Translation—DE-102015119295-A1 (Year: 2023).*
Translation—JP-2015105644-A (Year: 2023).*
Translation—JP-2020084874-A (Year: 2023).*
Translation—JP-2013238143-A (Year: 2023).*
Translation—WO-2012066979-A1 (Year: 2023).*
Translation—EP-2975269-A1 (Year: 2023).*
English language abstract and machine-assisted English translation for CN 102767538 B extracted from espacenet.com database on May 19, 2021, 10 pages.

* cited by examiner

COMPRESSOR DEVICE OF A SUPERCHARGING DEVICE FOR AN INTERNAL COMBUSTION ENGINE

CROSS-REFERENCE TO RELATED APPLICATIONS

The present application claims priority to and all the benefits of German Patent Application No. 102020112870.3, filed May 12, 2020, the disclosure of which is expressly hereby incorporated herein by reference in its entirety.

TECHNICAL FIELD

The invention relates to a compressor device of a supercharging device for an internal combustion engine.

BACKGROUND

A supercharging device in an internal combustion engine increases the performance thereof because, by means of a compressor, a fresh-air pressure in an intake system of the internal combustion engine is increased. An exhaust-gas turbocharger, such as is used in vehicles with an internal combustion engine, is one embodiment of a supercharging device, in the case of which a turbine is driven by the exhaust gas of the internal combustion engine, and the rotation of said turbine is transmitted via a common shaft to a compressor wheel in order to compress the fresh air fed to the internal combustion engine. In an alternative supercharging device, an electric motor may drive the shaft of the compressor wheel.

An exhaust-gas recirculation (abbreviated to EGR) means is used to reduce the emissions of nitrogen oxides that form during the combustion of fuel in the internal combustion engine. This measure of reducing the formation of nitrogen oxides already during the combustion, and not only implementing measures for exhaust-gas aftertreatment, makes it easier for prescribed emissions limit values to be complied with.

CN 102767538 B describes an exhaust-gas turbocharger with multiple air inlets arranged in radially encircling fashion at the compressor. EP 1789683 B1 describes a compressor with a separator for separating off solid particles from a recirculated gas stream, which separator is guided in arcuate fashion around the inlet of the compressor before issuing into the inlet thereof.

For exhaust-gas recirculation, mixing of the recirculated exhaust-gas flow with the air fed to the internal combustion engine has hitherto been sought. The mixing takes place over a region of approximately 50 to 150 mm between an exhaust-gas inlet and the compressor wheel. Here, the hot exhaust gas with the water vapor contained therein mixes with the considerably colder air, which leads to the condensation of the water vapor and to the formation of condensation water. In order to comply with emissions limit values for modern engines, for example the EU7 standard, even over a broad operating range down to −15 degrees Celsius, it is desirable to reduce the condensation.

SUMMARY OF THE INVENTION

This is realized by means of a compressor device having the features of claim 1.

The compressor device of a supercharging device for an internal combustion engine comprises an inlet channel with a side wall, an exhaust-gas inlet in the side wall, at which exhaust-gas inlet an exhaust-gas recirculation channel opens into the inlet channel, and a flow barrier in the inlet channel, which flow barrier at least partially spans the exhaust-gas inlet, is spaced apart from the exhaust-gas inlet and is suitable for diverting exhaust gas which flows from the exhaust-gas inlet into the inlet channel at an angle with respect to an axial direction of the inlet channel or with respect to the axis of the compressor.

The compressor device comprises at least the compressor. The flow barrier is positioned in the inlet region of the compressor and may be comprised by the compressor. In an alternative embodiment, said flow barrier is part of the air feed pipe that is fastened to the inlet of the compressor. In the case of this embodiment, the compressor device comprises not only the compressor but also the air feed pipe. The flow barrier may be comprised by an insert that is positionable in an inlet region of the compressor. Such an insert has a sleeve-shaped outer wall and may be a separate inlay component or part of the air feed pipe.

Air is fed to the compressor wheel of the compressor through the inlet channel. The exhaust gas that is recirculated through the exhaust-gas recirculation channel is fed through the exhaust-gas inlet into the inlet channel. The exhaust gas flows obliquely into the inlet channel, that is to say at an angle with respect to an axial direction of the inlet channel or with respect to the axis of the compressor, which corresponds to the axis of rotation of the compressor wheel. In the case of an inlet channel which runs in straight fashion in the region of the exhaust-gas recirculation channel, the axial direction and the axis of the compressor coincide. Exhaust gas refers to gas output by the internal combustion engine at the exhaust-gas side, commonly the combustion product of the internal combustion engine.

The flow barrier is spaced apart from the exhaust-gas inlet of the side wall so as to not impede the inflow of the exhaust gas into the inlet channel but spatially delimit said inflow, that is to say allow said inflow in a radial direction only as far as the flow barrier. The flow barrier advantageously spans the exhaust-gas inlet and reduces the mixing of the recirculated exhaust gas, which flows in laterally with respect to the axial direction, with the axially inflowing air, by virtue of said flow barrier limiting the radial propagation of the exhaust gas into the inlet channel and diverting the exhaust gas into an axial direction onto a compressor wheel of the compressor. The flow barrier substantially prevents the occurrence of a boundary layer between the hot exhaust gas and the relatively cold air, because the flow barrier substantially separates the gas streams from one another, significantly reduces the mixing thereof, and thus considerably reduces condensation.

In one embodiment of the compressor, the compressor wheel is connected via a shaft to a turbine wheel which can be driven by an exhaust-gas stream, such that the supercharging device is designed as an exhaust-gas turbocharger. In an alternative embodiment, the compressor wheel is connected via a shaft to an electric motor, such that the supercharging device is designed as an electrically driven compressor. An exhaust-gas turbocharger and electrically driven compressor may be combined with one another, this also being referred to as an electrically assisted turbocharger.

In one embodiment, in an inlet of the compressor, there is provided an insert which defines an inlet channel through which the air flows onto the compressor wheel. The insert and the housing of the compressor, which housing defines the inlet of the compressor, are separate components; however, the insert may be fixable to a component. The flow barrier is part of the insert.

The insert for the inlet of the compressor of a supercharging device for an internal combustion engine also solves the problem of reducing the condensation. The insert is a separate sleeve-shaped component which is positioned upstream of the compressor wheel. The insert comprises an inlet channel with a side wall, an exhaust-gas inlet in the side wall, and a flow barrier in the inlet channel, which flow barrier at least partially spans the exhaust-gas inlet, is spaced apart from the exhaust-gas inlet and is suitable for diverting exhaust gas which flows from the exhaust-gas inlet into the inlet channel at an angle with respect to the axial direction of the inlet channel.

In an alternative embodiment, the insert may be provided as part of an air feed pipe in the connector region thereof. In the case of the air feed pipe being fastened to the compressor, the insert that can be pushed in or pressed in is pushed or pressed into the inlet of the compressor.

In another embodiment, the flow barrier is arranged in the connector region of an air feed pipe and can be pushed or pressed into an inlet of the compressor, such that the inlet defines the side wall of the inlet channel. In other words: The flow barrier is a feature which projects out of the air feed pipe at an end side and, during the fastening of the air feed pipe to the compressor, is pushed or pressed into the housing of the compressor, which housing defines the inlet channel. In the case of a flow barrier which has been pushed in, the connection thereof to the side wall of the inlet channel is easily releasable by virtue of the flow barrier being pulled out. During the pressing-in, a connection is formed with in particular elastic deformation of the components, the undesired release of which is prevented by non-positive locking.

In one embodiment, the flow barrier extends as far as the side wall of the inlet channel and is open in an axial direction, such that the air can flow past on the side which is averted from the exhaust-gas inlet and on the side which faces toward said exhaust-gas inlet. The following statements relate both to the compressor and to the insert for the inlet of the compressor.

In one embodiment, the flow barrier extends substantially in an axial direction and perpendicular thereto, such that the air can flow in an axial direction onto the compressor wheel. The flow barrier scarcely influences the gas flow and thus the performance of the compressor. This effect is further supported if the wall thickness of the flow barrier is significantly smaller than the extent of the flow barrier in an axial direction. The flow barrier comprises one or more walls. The walls are advantageously arranged parallel to the longitudinal axis. They are straight or have a slight curvature. Nevertheless, one embodiment of the flow barrier may have means for generating turbulence in the throughflowing gas stream, for example radially twisted walls.

The flow barrier may have an axial length of approximately 80 mm. In one embodiment, the flow barrier extends over an axial region which is at least twice as long as the diameter of the exhaust-gas inlet or the axial extent thereof. In a cross-sectional area perpendicular to the axial direction in the region of the exhaust-gas inlet, the flow barrier defines and surrounds a mouth cross-sectional region, which is adjacent to the exhaust-gas inlet and into which the exhaust gas flows, and separates said mouth cross-sectional region from a further cross-sectional region, through which only air flows. In the case of a relatively narrow exhaust-gas inlet, in a cross-sectional area perpendicular to the axial direction in the region of the exhaust-gas inlet, the flow barrier and the side wall define and surround the mouth cross-sectional region adjacent to the exhaust-gas inlet and separate said mouth cross-sectional region from the further cross-sectional region.

In one embodiment, the flow barrier has multiple walls, which each run from an intersection region in the interior of the inlet channel to the side wall and which thus form, for example, a flow barrier with a cruciform cross section. The intersection region may run along the longitudinal axis of the compressor, such that, owing to the symmetry, a mechanically stable flow barrier is realized.

One embodiment of a compressor comprises a further exhaust-gas inlet which is advantageously situated opposite the exhaust-gas inlet and which is at least partially spanned by the flow barrier which is spaced apart therefrom. The flow barrier is suitable for diverting exhaust gas which flows from the further exhaust-gas inlet into the inlet channel at an angle with respect to the axial direction of the inlet channel or with respect to the axis of the compressor and thus directing said exhaust gas axially onto the compressor wheel. Compressors with multiple, in particular two, exhaust-gas inlets are used for example in the case of Otto engines. In a further embodiment, a recirculation channel inlet is provided which is at least partially spanned by the flow barrier which is spaced apart therefrom. Such a recirculation channel inlet recirculates air via a recirculation channel from the outlet region of the compressor to the compressor inlet region. A further recirculation channel can recirculate air from the outlet region of the compressor into the exhaust-gas recirculation channel. Recirculation channels are used in Otto engines.

In one embodiment, the side wall of the inlet channel is defined by the housing of the compressor or of an inlet module of the compressor, which inlet module is mounted at the inlet side of the compressor wheel, and the flow barrier is formed as a single piece with the housing, which allows simple manufacture. Alternatively, the flow barrier is cast into the housing. This compound casting approach allows different materials for the flow barrier, for example sheet steel or sheet aluminum, and for the housing, for example an aluminum alloy, to be combined. The flow barrier is advantageously metallic, for example composed of steel or aluminum or an aluminum alloy, or manufactured from a plastic. Manufacturing in multiple parts, with subsequent joining of the components, is alternatively possible. In these embodiments, the flow barrier is inserted or pressed into the housing. In the case of insertion, the flow barrier can for example be pushed into a groove. The flow barrier is advantageously held by non-positive locking, this also being referred to as "pressed in". The flow barrier may for example be pressed against the side wall or into a groove on the side wall.

A number of exemplary embodiments will be discussed in more detail below on the basis of the drawing.

DETAILED DESCRIPTION

In the figures, identical features or features of identical function are denoted by the same reference designations.

Figure 1:
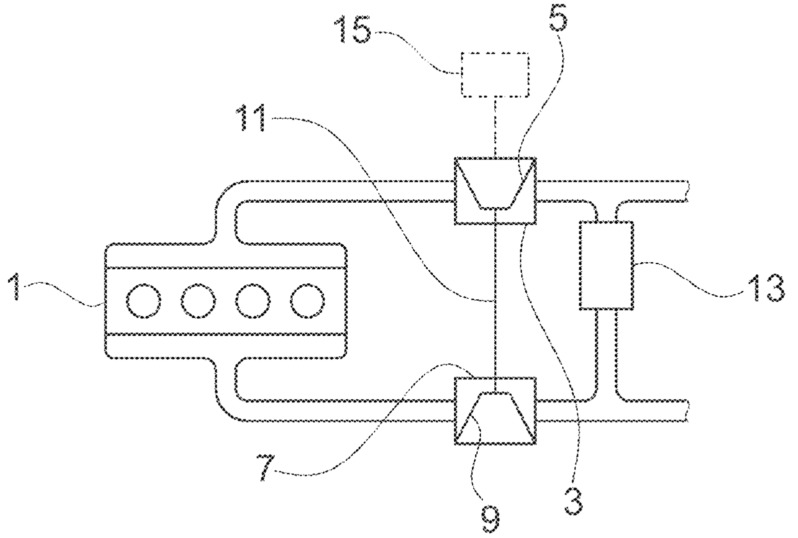
FIG. 1 schematically shows an exemplary embodiment of a supercharging device with an internal combustion engine.

FIG. 1 schematically shows an exemplary embodiment of a supercharging device with an internal combustion engine.

The supercharging device is designed as an exhaust-gas turbocharger. A compressor 3 with a compressor wheel 5 is arranged at the intake side of the internal combustion engine 1. A turbine 7 is arranged at the exhaust-gas side of the internal combustion engine 1, the turbine wheel 9 of which turbine is coupled via a common shaft 11 to the compressor wheel 5 of the compressor 3.

The turbine wheel 9 is set in rotation by exhaust gas of the internal combustion engine 1 and drives the compressor wheel 5 via the shaft 11, such that the air stream conducted to the internal combustion engine 1 is compressed.

An exhaust-gas recirculation means 13, commonly comprising a cooler and an EGR valve, feeds a proportion of the exhaust gas into the air stream that is conducted to the compressor 3, typically for the purposes of reducing nitrogen oxide emissions.

In an alternative exemplary embodiment of the supercharging device, the compressor 3 may be driven not by the turbine 7 but in some other manner, for example by an electric motor 15 which drives the shaft of the compressor wheel 5. This alternative is illustrated by dashed lines in FIG. 1. In one exemplary embodiment, the electric motor 15 may be provided in addition to the turbine 7.

Figure 2:
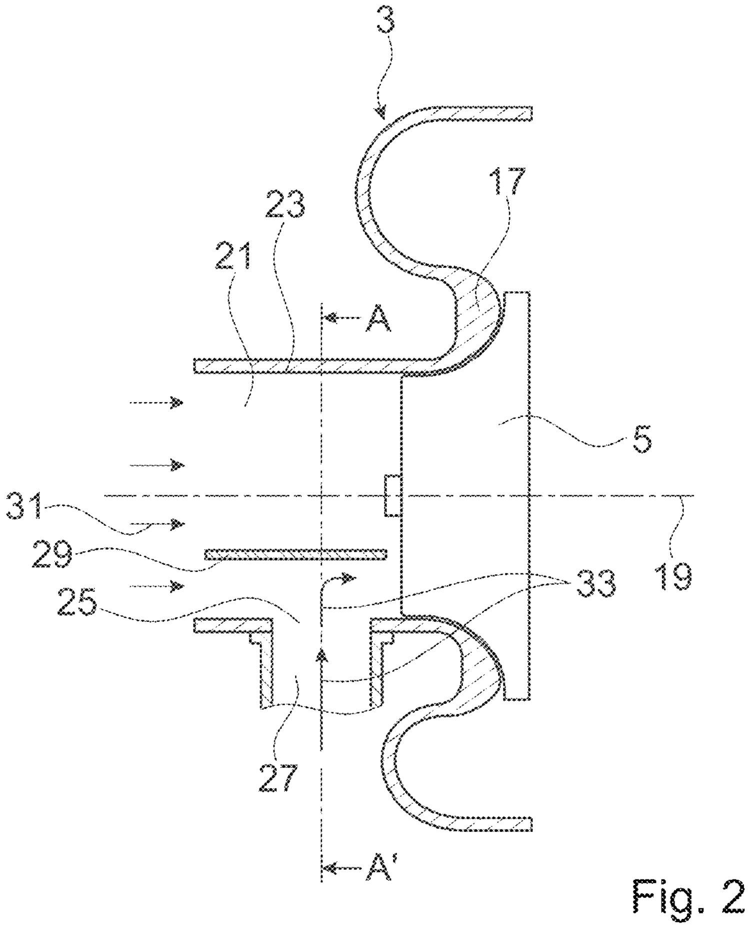
FIG. 2 shows a sectional illustration of an exemplary embodiment of a compressor of a supercharging device for an internal combustion engine.

FIG. 2 shows a sectional illustration of an exemplary embodiment of a compressor 3 of a supercharging device for an internal combustion engine 1, for example of the compressor 3 of an exhaust-gas turbocharger.

The compressor 3 has a housing 17 in which a compressor wheel 5 is arranged. The compressor wheel 5 is rotatable about a longitudinal axis 19 which defines an axial direction. At the inlet side of the compressor 3, the housing 17 defines an inlet channel 21, which is delimited by a side wall 23 which is formed by the housing 17. The inlet channel 21 has a substantially circular or oval cross section. In the side wall 23 of the inlet channel 21, there is an exhaust-gas inlet 25 which is formed as a cutout in the side wall 23. At the exhaust-gas inlet 25, an exhaust-gas recirculation channel 27, also referred to as EGR channel, opens into the inlet channel 21.

In the inlet channel 21, there is provided a flow barrier 29 which spans the exhaust-gas inlet 25 and which is spaced apart from the latter, such that the flow barrier 29 is positioned between the exhaust-gas inlet 25 and the oppositely situated side wall 23. The flow barrier 29 is suitable for limiting the radial propagation of an exhaust-gas flow which flows laterally out of the exhaust-gas inlet 25 and for diverting said exhaust-gas flow in an axial direction onto the compressor wheel 5. In order to achieve this effect, the axial and areal extent of the flow barrier 29 is greater than that of the exhaust-gas inlet 25.

The flow barrier 29 extends in an axial direction substantially parallel to the longitudinal axis 19 across the exhaust-gas inlet 25 as far as, or almost as far as, the compressor wheel 5. Said flow barrier is open in an axial direction both on the side facing toward the compressor wheel 5 and on the side averted therefrom. The axial extent of the flow barrier 29 is advantageously at least twice that of the exhaust-gas inlet 25. The flow barrier 29 extends transversely with respect to the longitudinal axis 19 as far as the side wall 23, such that two flow paths are formed in the region of the exhaust-gas inlet 25. One runs on that side of the flow barrier 29 which faces toward the exhaust-gas inlet 25. The other runs on that side of the flow barrier 29 which is averted from the exhaust-gas inlet 25. Since the flow barrier 29 is open in an axial direction, the gas stream can flow past said flow barrier in an axial direction along both flow paths.

The flow barrier 29 is of substantially areal form and has a small wall thickness so as to restrict the throughflow region of the inlet channel 21 only to a small extent. Said flow barrier is advantageously metallic, for example composed of aluminum or an aluminum alloy, or composed of a heat-resistant plastic. Said flow barrier may be composed of the same material as the housing 17 and formed in one piece therewith. Alternatively, said flow barrier is fixed in the housing 17 for example by casting, which can be associated with different materials of housing 17 and flow barrier 29.

The inlet channel 21 conducts air in an axial direction, indicated by arrows 31, onto the compressor wheel 5. The exhaust gas is conducted through the exhaust-gas channel 27 and through the exhaust-gas inlet 25 into the inlet channel 21 at an angle, preferably at right angles, with respect to the longitudinal axis 19. The exhaust gas flows onto the flow barrier 29, which limits the flow of the exhaust gas in a radial direction, and said exhaust gas is diverted such that it is conducted, substantially only through the flow path on that side of the flow barrier 29 which faces toward the exhaust-gas inlet 25, in an axial direction onto the compressor wheel 5. This is indicated by arrows 33 which illustrate the exhaust-gas flow. Only little mixing of the exhaust gas with the air occurs, because said air flows predominantly along the flow path on that side of the flow barrier 29 which is averted from the exhaust-gas inlet 25, on which flow path said air undergoes no mixing with the exhaust gas. The flow barrier 29 serves as a separator between air stream and exhaust-gas stream, the separating action of which substantially prevents mixing between air which flows in an axial direction and the exhaust-gas stream. In particular, the flow barrier 29 prevents the radial propagation of the exhaust-gas stream into the air stream, which prevents the formation of an expanded condensation region and thus also significantly reduces the condensation effect.

The flow barrier 29 extends as far as or almost as far as the compressor wheel 5, such that mixing of air and recirculated exhaust gas is substantially prevented in the inlet channel 21, and the air stream and the exhaust-gas stream are conducted as substantially separate gas streams onto the compressor wheel 5. The flow barrier 29 substantially prevents condensation from being able to occur at a boundary layer between the hot exhaust gas and the relatively cold air, because the flow barrier 29 spatially separates the gas streams and prevents the mixing thereof. Owing to the small wall thickness of the flow barrier 29, and the course thereof parallel to the longitudinal axis 19, said flow barrier has only little influence on the air flow to the compressor wheel 5.

Figure 3:
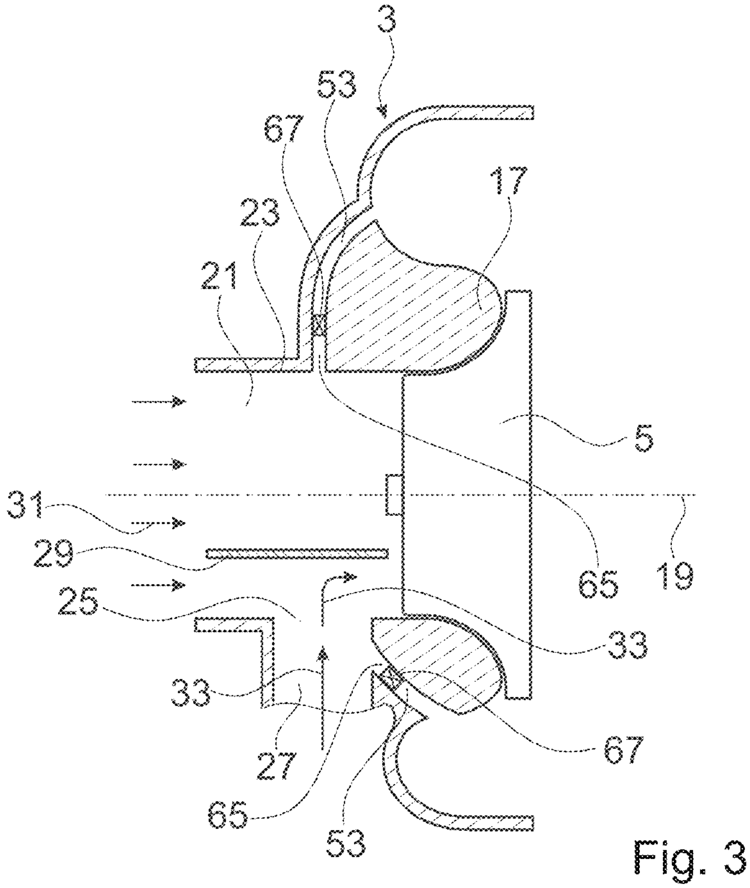
FIG. 3 shows a sectional illustration of a further exemplary embodiment of a compressor of a supercharging device for an internal combustion engine.

FIG. 3 shows a sectional illustration of a further exemplary embodiment of a compressor of a supercharging device for an internal combustion engine. In order to avoid repetitions, the description will concentrate on the differences in relation to the exemplary embodiment in FIG. 2.

The exemplary embodiment additionally has recirculation channels 53 which connect the outlet-side compressor region to the inlet-side compressor region. The recirculation channel 53 can be opened and closed by means of a controllable valve 67, which is schematically illustrated. When the valve 67 is open, in this way, air is recirculated from the spiral region of the compressor 3 to the inlet region. One of the recirculation channels 53 opens at a recirculation channel inlet 65 into the exhaust-gas recirculation channel 27, such that the gas stream from the recirculation channel 53 is diverted, together with the exhaust gas, by the flow barrier 29. The other recirculation channel 53 opens into the inlet channel 21 at a recirculation channel inlet 65 in the side wall 23. In this exemplary embodiment, the recirculation channels 53 are formed as channels in the compressor housing 17. The recirculation channels 53 serve as a characteristic-map-stabilizing measure in Otto engines. The recirculation channel 53 makes it possible, during the closing of a throttle flap, to dissipate a pressure increase of the compressor that continues to impart a conveying action, by virtue of a connecting channel between pressure side and intake side of the compressor housing being opened.

Figure 4:
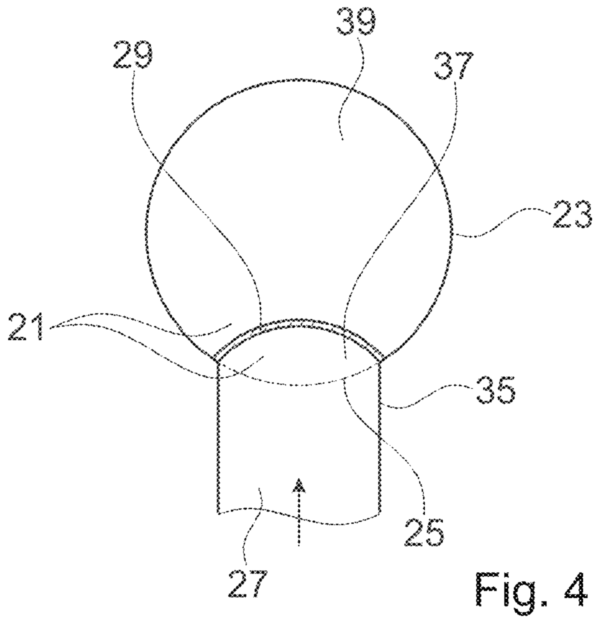
FIG. 4 shows a cross section perpendicular to the longitudinal axis through the compressor in FIG. 2 in the region of an exhaust-gas inlet.

FIG. 4 shows a cross section perpendicular to the longitudinal axis 19 through the inlet channel 21 and the exhaust-gas recirculation channel 27 in the region of the exhaust-gas inlet 25, at the line A-A' illustrated in FIG. 1. For the sake of clarity, the housing 17 is not illustrated, the illustration showing only the side wall 23 of the inlet channel 21 and the side wall 35 of the exhaust-gas recirculation channel 27.

Perpendicular to the longitudinal axis 19, the flow barrier 29 has a curved course and, in this exemplary embodiment, extends as far as both sides of the exhaust-gas inlet 25. A mouth cross-sectional region 37 of the inlet channel 21 adjacent to the exhaust-gas inlet 25 is surrounded by the flow barrier 29. In the mouth cross-sectional region 37, the exhaust gas flows into the inlet channel 21 and is then diverted into the direction of the compressor wheel 5. The flow barrier 29 separates the mouth cross-sectional region 37 from the cross-sectional region 39 through which substantially only air flows onto the compressor wheel 5.

Figure 5:
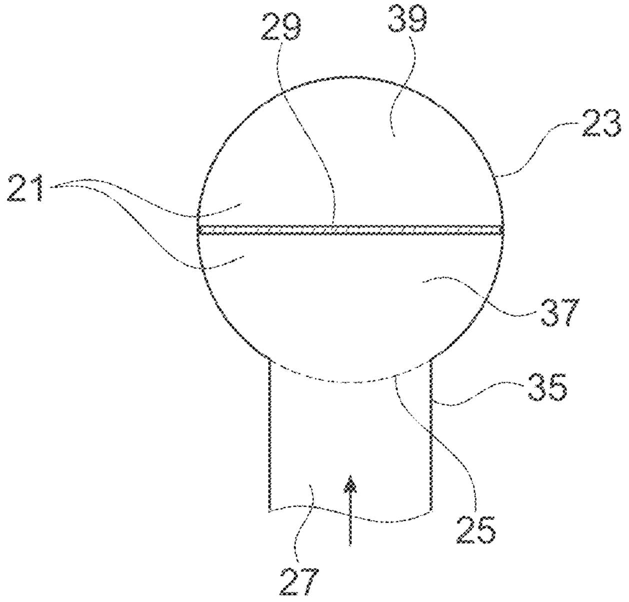
FIG. 5 shows a cross section perpendicular to the longitudinal axis through a further exemplary embodiment of a compressor in the region of an exhaust-gas inlet.

FIG. 5 shows a cross section perpendicular to the longitudinal axis 19 through the inlet channel 21 and the exhaust-gas recirculation channel 27 in the region of the exhaust-gas inlet 25 for a further exemplary embodiment. In order to avoid repetitions, the description will concentrate on differences in relation to the preceding exemplary embodiment.

In this exemplary embodiment, the flow barrier 29 runs as a straight wall through and parallel to the longitudinal axis 19. The flow barrier 29 and the side wall 23 adjacent to the exhaust-gas inlet 25 define a mouth cross-sectional region 37, which is separated by the flow barrier 29 from the cross-sectional region 39 through which substantially only the air flows onto the compressor wheel 5.

In a further exemplary embodiment, the flow barrier 29 may likewise be formed as a straight wall, which is however arranged closer to the exhaust-gas inlet 25.

Figure 6:
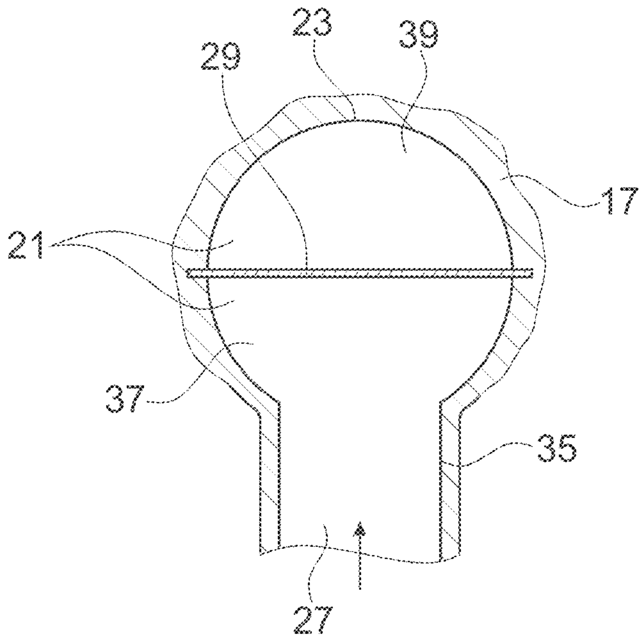
FIG. 6 shows a cross section with further details of the exemplary embodiment from FIG. 5.

FIG. 6 shows a cross section of the above-described exemplary embodiment with further details.

The flow barrier 29, which is in the form of a thin, planar wall, extends as far as into the housing 17 that defines the side wall 23 of the inlet channel 21, and said flow barrier is held in its position by the housing 17. This can be achieved by virtue of the flow barrier 29 being cast into the housing 17 during the manufacturing process. In the case of such a compound casting approach, the flow barrier 29 and the housing 17 may be formed from different materials.

The connector region of the exhaust-gas channel 27 is, in this exemplary embodiment, formed as a single piece with the housing 17 that defines the inlet channel 21. Alternatively, the connector region of the exhaust-gas channel 21 may be formed as a separate component or as a module which is mounted onto the housing 17 that defines the inlet channel 21.

Figure 7:
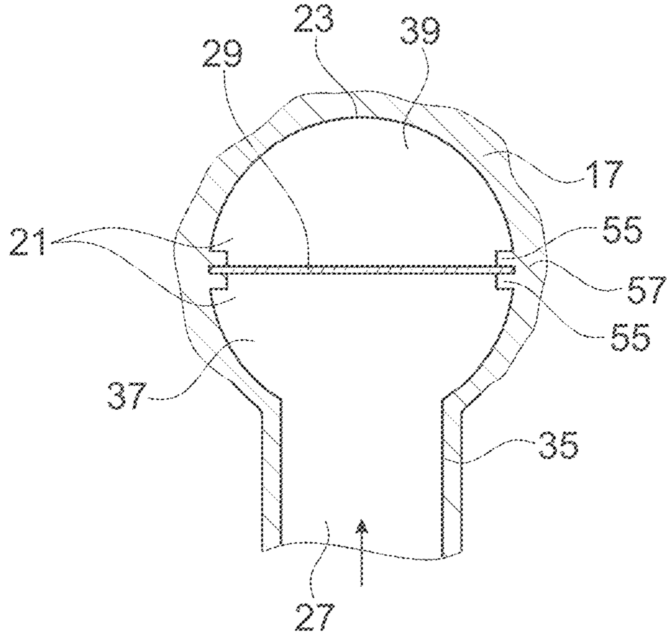
FIG. 7 shows a cross section with details of a further exemplary embodiment of a compressor in the region of an exhaust-gas inlet.

FIG. 7 shows a cross section with details of a further exemplary embodiment of a compressor in the region of an exhaust-gas inlet. The description will concentrate on differences in relation to the preceding exemplary embodiment.

The flow barrier 29 has been pushed into grooves 57 in the side wall 23 in order to be positioned and fastened in the inlet channel. The flow barrier 29 has advantageously been pressed into the grooves 57, such that a non-positively locking connection is formed as a result of the deformation of the flow barrier 29 and/or of the grooves 57. Grooves 57 may be formed as cutouts between elevations 55 in the housing 17, as illustrated in FIG. 7. Alternatively, the grooves 57 may be formed as indentations in the housing wall.

Figure 8:
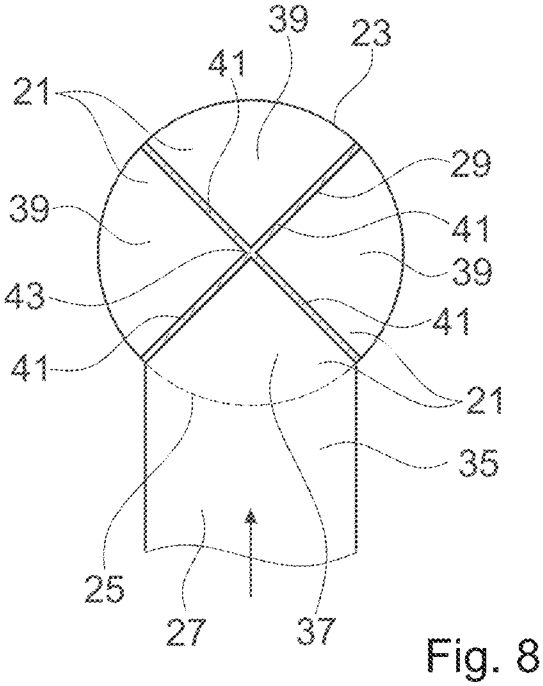
FIG. 8 shows a cross section perpendicular to the longitudinal axis through a further exemplary embodiment of a compressor in the region of an exhaust-gas inlet.

FIG. 8 shows a cross section perpendicular to the longitudinal axis 19 through the inlet channel 21 and the exhaust-gas recirculation channel 27 in the region of the exhaust-gas inlet 25 for a further exemplary embodiment. The description will concentrate on differences in relation to the preceding exemplary embodiments.

The flow barrier 29 with multiple walls 41 has a cruciform cross section, in the case of which the intersection region 43 of the walls 41 runs along the longitudinal axis 19. The four walls 41 of the flow barrier 29 run parallel to the longitudinal axis 19 and extend from the longitudinal axis 19 to the side wall 23. Such a flow barrier 29 with multiple walls 41 is mechanically stable.

Two walls 41 of the flow barrier 29 extend to both sides of the exhaust-gas inlet 25 and delimit the mouth cross-sectional region 37. Substantially only air flows through the three other cross-sectional quadrants 39, which are defined, and separated from the mouth cross-sectional region 37, by the flow barrier 29.

Figure 9:
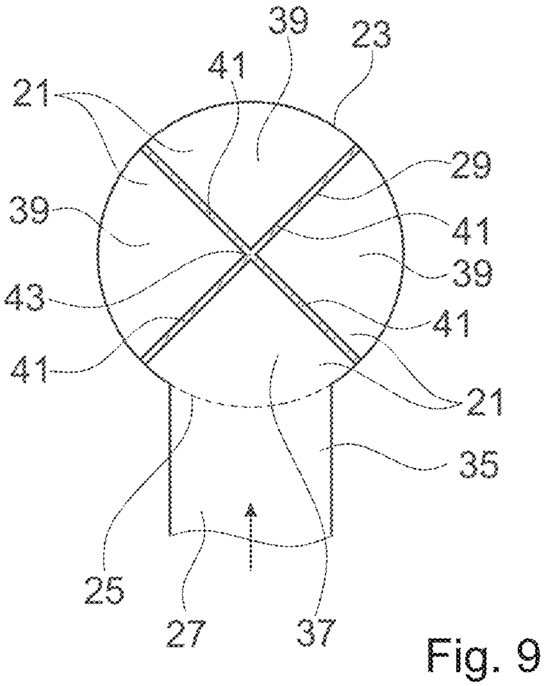
FIG. 9 shows a cross section perpendicular to the longitudinal axis through a further exemplary embodiment of a compressor in the region of an exhaust-gas inlet.

FIG. 9 shows a cross section perpendicular to the longitudinal axis 19 through the inlet channel 21 and the exhaust-gas recirculation channel 27 in the region of the exhaust-gas inlet 25 for a further exemplary embodiment.

The exemplary embodiment in FIG. 9 differs from the preceding exemplary embodiment by the fact that the exhaust-gas inlet 25 is narrower and does not extend as far as the walls of the flow barrier 29. The walls 41 of the flow barrier 29 and the side wall 23 adjacent to the exhaust-gas inlet 25 define the mouth cross-sectional region 37, through which the exhaust gas flows.

Figure 10:
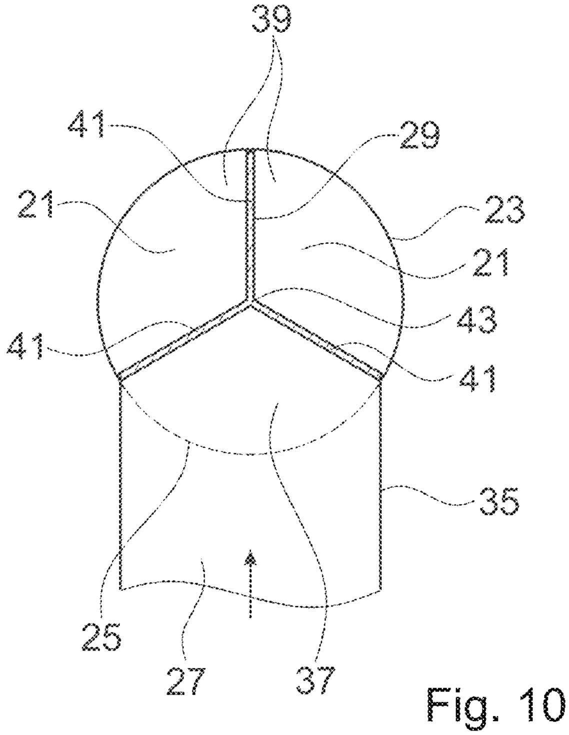
FIG. 10 shows a cross section perpendicular to the longitudinal axis through a further exemplary embodiment of a compressor in the region of an exhaust-gas inlet.

FIG. 10 shows a cross section perpendicular to the longitudinal axis 19 through the inlet channel 21 and the exhaust-gas recirculation channel 27 in the region of the exhaust-gas inlet 25 for a further exemplary embodiment. The description will concentrate on differences in relation to the preceding exemplary embodiment.

The flow barrier 29 has a star-shaped cross section with three walls 41. The exhaust-gas inlet 25 extends as far as the walls 41 of the flow barrier 29. It is also conceivable for said exhaust-gas inlet to be of narrower form.

Figure 11:
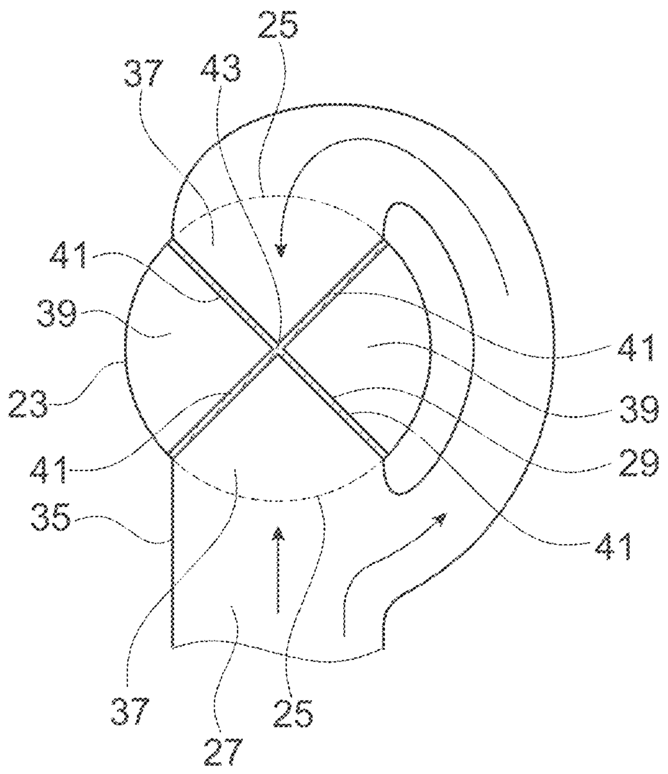
FIG. 11 shows a cross section perpendicular to the longitudinal axis through a further exemplary embodiment of a compressor in the region of an exhaust-gas inlet.

FIG. 11 shows a cross section perpendicular to the longitudinal axis 19 through the inlet channel 21 and the exhaust-gas recirculation channel 27 in the region of the exhaust-gas inlet 25 for a further exemplary embodiment. The description will concentrate on differences in relation to the preceding exemplary embodiments.

In the side wall 23, two exhaust-gas inlets 25 are provided on mutually opposite sides of the inlet channel 21. The exhaust-gas recirculation channel 27 branches such that it has two arms. One opens perpendicularly into one of the exhaust-gas inlets 25. The other arm branches off and runs around the inlet channel 21 to the other exhaust-gas inlet 25.

The flow barrier 29 has a cruciform cross section, and its walls 41 extend to both sides of the exhaust-gas inlets 25. Two oppositely situated cross-sectional quadrants are mouth cross-sectional regions 37 adjacent to the exhaust-gas inlets 25. Only air flows through the other quadrants 39, which are separated from the mouth cross sections 37 by the flow barrier 29.

This exemplary embodiment with two exhaust-gas inlets 25 is used in particular in Otto engines.

Figure 12:
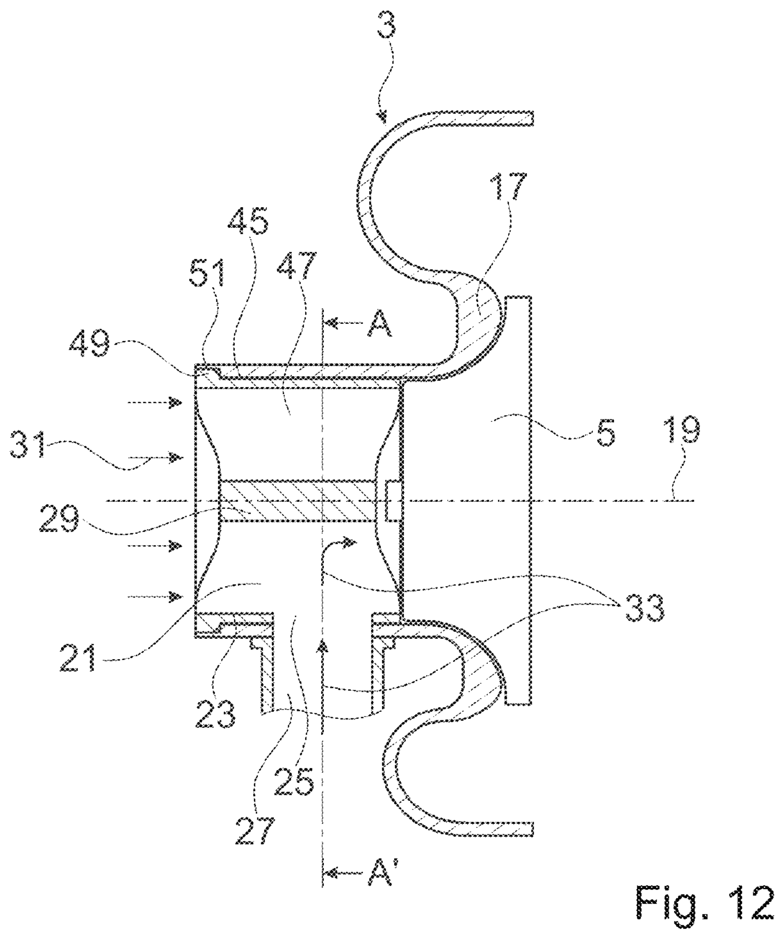
FIG. 12 shows a sectional illustration of a further exemplary embodiment of a compressor of a supercharging device for an internal combustion engine with an exemplary embodiment of an insert.

FIG. 12 shows a sectional illustration of a further exemplary embodiment of a compressor 3 of a supercharging device for an internal combustion engine 1, for example of the compressor of an exhaust-gas turbocharger. In order to avoid repetitions, only the differences in relation to the exemplary embodiment in FIG. 2 will be described.

The housing 17 defines, at the inlet side of the compressor wheel 5, an inlet 45 in which a sleeve-shaped insert 47 is arranged. The insert 47 is a separate component that is placed or pressed into the inlet 45 of the compressor 3 and positioned upstream of the compressor wheel 5. The shape and size of said insert correspond to the inlet 45 such that said insert can be inserted flush therein. The insert 47 has, at the side averted from the compressor wheel 5, a flange 49 which engages into a groove 51 of the inlet 45 and which thus holds the insert 47 in a specified position.

A side wall 23 of the insert 47 defines an inlet channel 21 through which the air is conducted to the compressor wheel 5. Furthermore, the insert 47 has an exhaust-gas inlet 25 formed as a cutout in the side wall 23. Through the exhaust-gas inlet 25, exhaust gas that has been recirculated via an exhaust-gas recirculation channel 27 can flow via a cutout in the inlet 45 into the inlet channel 21. Furthermore, a flow barrier 29 is provided in the insert 47, which flow barrier spans the exhaust-gas inlet 25, is spaced apart therefrom and is suitable for diverting the exhaust gas that flows in at an angle with respect to the axial direction of the inlet channel 21 in an axial direction to the compressor wheel 5. In this exemplary embodiment, the flow barrier 29 has a cruciform cross section.

Figure 13:
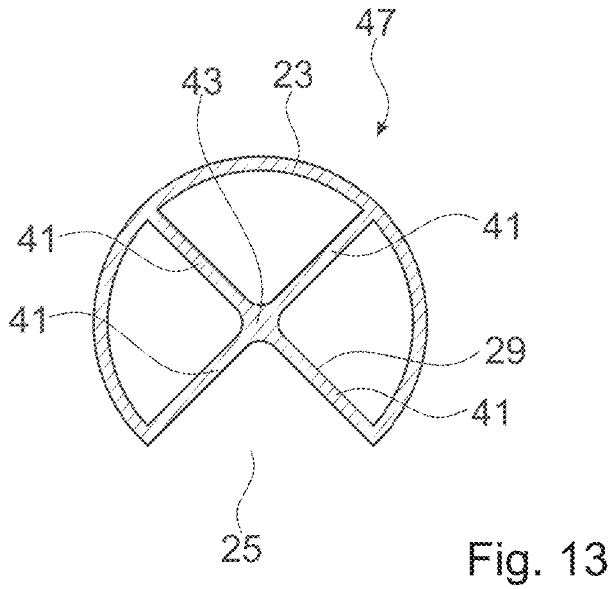
FIG. 13 shows a cross section perpendicular to the longitudinal axis through the exemplary embodiment of the insert from FIG. 10.

FIG. 13 shows a cross section perpendicular to the longitudinal axis 19 through the insert 47 along the line A-A' illustrated in FIG. 10. The cross section of the insert 47 shows the cruciform flow barrier 29, the walls 41 of which extend from the intersection region 43, which runs along the longitudinal axis 19, to the side wall 23. Such an insert 47 may be manufactured as a single piece. The functioning of the flow barrier 29 in the insert 47 corresponds to the functioning of a flow barrier 29 arranged in the housing 17, as has been described above in conjunction with FIG. 6.

The exemplary embodiments of flow barriers 29 described in conjunction with FIGS. 1 to 8 may also be provided in exemplary embodiments of inserts 47 for the inlet 45 of the compressor 3.

Figure 14:
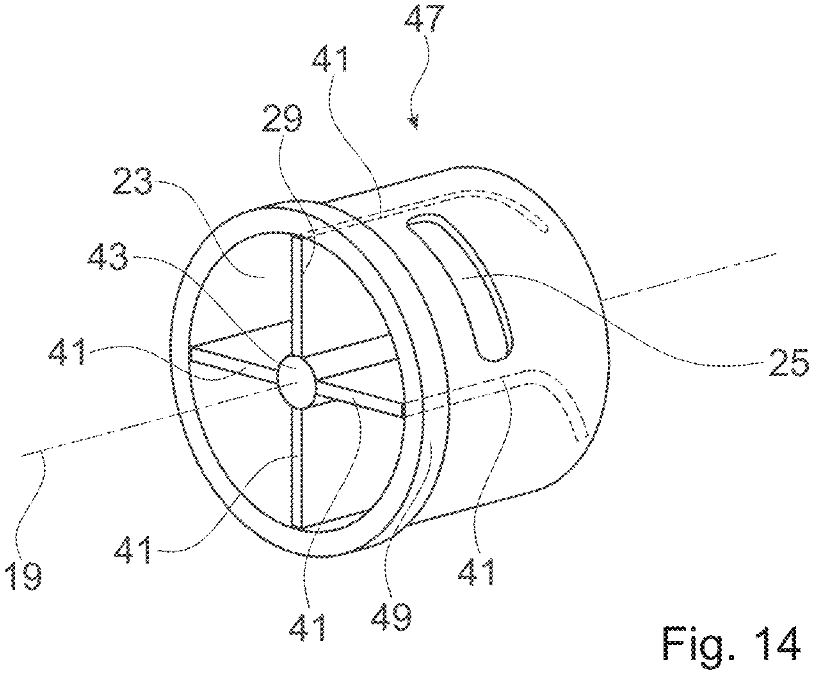
FIG. 14 shows a further exemplary embodiment of an insert in a three-dimensional illustration.

FIG. 14 shows a further exemplary embodiment of an insert 47 in a three-dimensional illustration. The description will concentrate on differences in relation to the preceding exemplary embodiment.

In this exemplary embodiment, the walls 41 of the flow barrier 29 do not run parallel to the longitudinal axis 19 but run regionally obliquely with respect to the plane that extends perpendicular to the longitudinal axis 19. The walls 41 run, in the region facing toward the compressor wheel 5, obliquely with respect to the longitudinal axis 19. In the region averted from the compressor wheel 3, said walls run parallel to the plane perpendicular to the longitudinal axis 19. The obliquity increases along the longitudinal axis, resulting in an increasing twist of the walls 41 in a radial direction. The twist generates turbulence in air that flows through the insert 47 and past the walls 41, before said air impinges on the compressor wheel 5.

Typical values for such a twist are for example walls 41 of the flow barrier 29 with an axial length of 50 mm and a twist of 10 mm radian measure.

Twisted walls 41 may also be provided in the case of flow barriers with other cross sections, as described in conjunction with the preceding exemplary embodiments.

The twist of the walls 41 may extend over the entire axial course of the walls 41 or only over a region thereof. In addition or as an alternative to twisted walls 41, further means for flow guidance, for example elevated structures on the walls 41, may be provided which have a turbulence-generating and homogenizing influence on the throughflowing gas stream.

Figure 15:
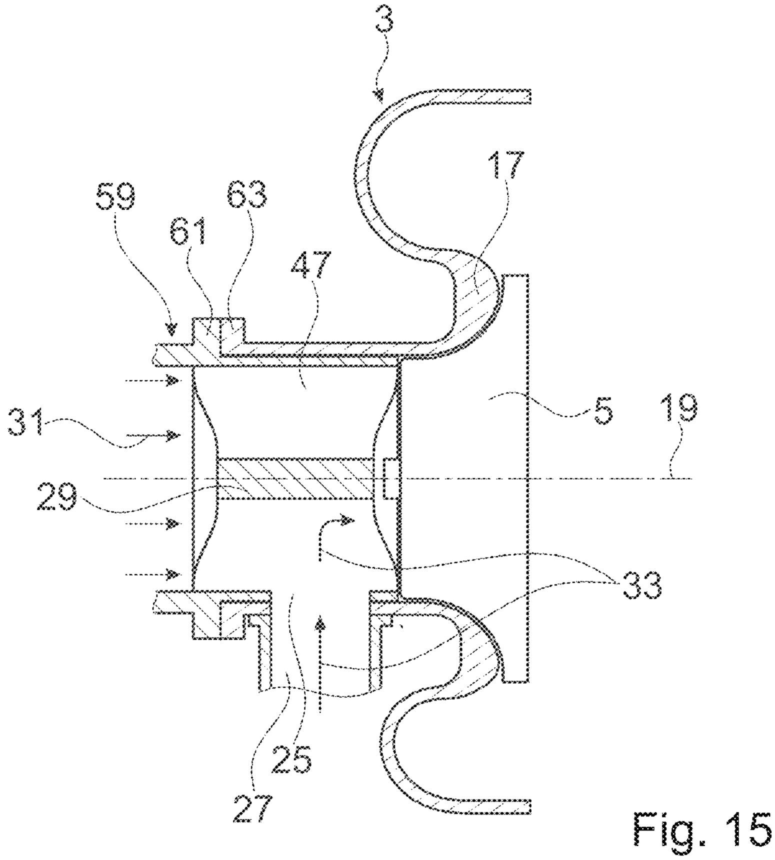
FIG. 15 shows a sectional illustration of an exemplary embodiment of a compressor device of a supercharging device for an internal combustion engine.

FIG. 15 shows a sectional illustration of a further exemplary embodiment of a compressor 3 of a supercharging device for an internal combustion engine 1, to the inlet of which an air feed pipe 59 has been fastened.

The end side of the air feed pipe 59 is designed as an insert 47 as described in conjunction with FIGS. 12 and 13 and has been pushed into the inlet 45. In that region of the insert 47 which is averted from the inlet 45, there is provided a flange 61 which abuts against a flange 63 of the housing 17 in order to position the insert 47 with the flow barrier 29 and fasten said insert to the housing 17. Holding means may be provided for further fixing.

Figure 16:
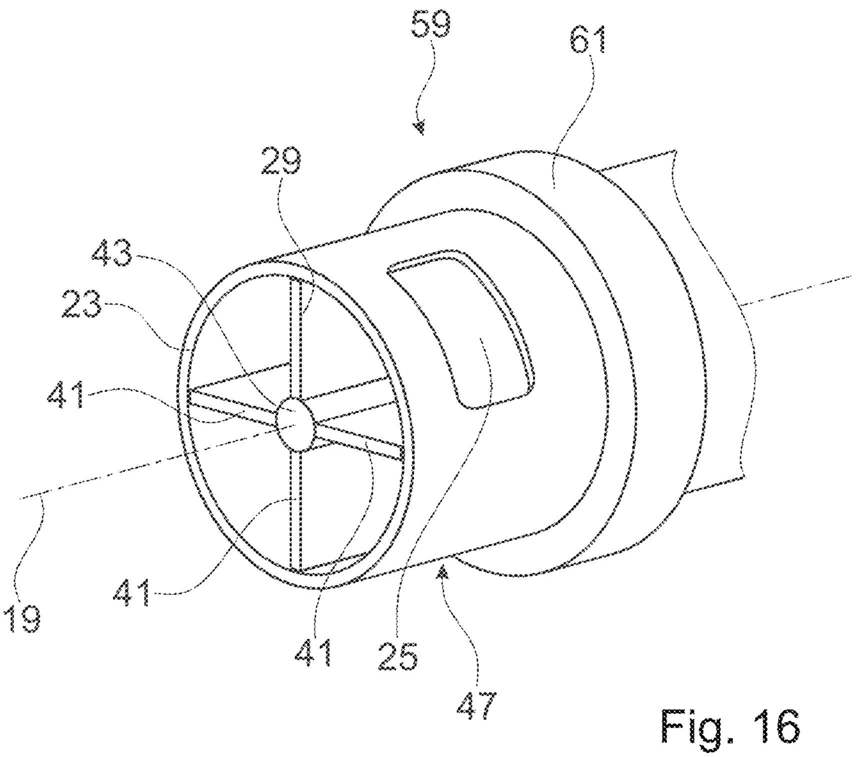
FIG. 16 shows an exemplary embodiment of an insert, at an end side of an air feed pipe, in a three-dimensional illustration.

FIG. 16 shows the exemplary embodiment of the insert 47, at the end side of the air feed pipe 59, in a three-dimensional illustration. The insert 47 is a constituent part of the air feed pipe 59 and is pushed into the inlet 45 of the compressor 3. In this exemplary embodiment, the air feed pipe 59 and the compressor 3 form the compressor device.

Figure 17:
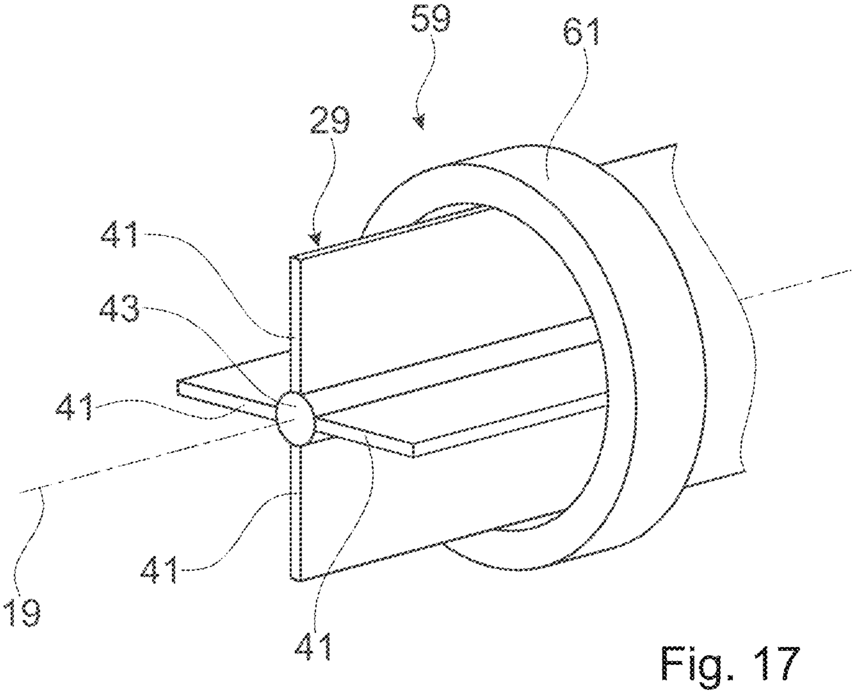
FIG. 17 shows an exemplary embodiment of a flow barrier, at an end side of an air feed pipe, in a three-dimensional illustration.

FIG. 17 shows, in a three-dimensional illustration, a further exemplary embodiment of an end side of the air feed pipe 59, in the case of which the flow barrier 29 at least regionally projects, without a side wall, out of the end side of the air feed pipe 59. The flow barrier 29 is pushed or pressed into the inlet 45 of the compressor 3, such that the wall of the inlet 45 defines the inlet channel. It is advantageous if means for positioning and alignment of the flow barrier 29, for example grooves as described in conjunction with FIG. 7, are provided on the wall of the inlet 45. A gas-tight connection between the flow barrier 29 and the side wall of the housing 17 can be achieved by pressing-in. Note that the flow barrier 29 that projects out of the air feed pipe 59 is not restricted to the cruciform cross section illustrated but may have other shapes. This applies in particular to the exemplary embodiments of flow barriers illustrated in the preceding figures. The flow barrier 29 without side wall, which projects out of the air feed pipe 59, is of material-saving design and allows easy assembly of air feed pipe 59 and inlet 45 of the compressor 3 by pushing or pressing of the flow barrier 29 into the inlet 45. Holding means may be provided for fixing.

The features specified above and in the claims and shown in the figures can be advantageously implemented both individually and in various combinations. The invention is not restricted to the exemplary embodiments described, but may be modified in various ways within the scope of the abilities of a person skilled in the art.

REFERENCE DESIGNATIONS

1 Internal combustion engine
3 Compressor
5 Compressor wheel
7 Turbine
9 Turbine wheel
11 Shaft
13 Exhaust-gas recirculation means
15 Electric motor
17 Housing
19 Longitudinal axis
21 Inlet channel
23 Side wall
25 Exhaust-gas inlet
27 Exhaust-gas recirculation channel
29 Flow barrier
31 Arrow
33 Arrow
35 Side wall
37 Mouth cross-sectional region
39 Cross-sectional region
41 Wall
43 Intersection region
45 Inlet
47 Insert
49 Flange
51 Groove
53 Recirculation channel
55 Elevation
57 Groove
59 Air feed pipe
61 Flange
63 Flange
65 Recirculation channel inlet
67 Valve

What is claimed:

1. A compressor device of a supercharging device for an internal combustion engine (1), having
an inlet channel (21) with a side wall (23),
a housing (17) that defines the side wall (23) of the inlet channel (21),
an exhaust-gas inlet (25) in the side wall (23), at which exhaust-gas enters an exhaust-gas recirculation channel (27) that opens into the inlet channel (21), and
a flow barrier (29) in the inlet channel (21), which flow barrier (29) is composed of plastic and spans the exhaust-gas inlet (25), is spaced apart from the exhaust-gas inlet (25) and is suitable for diverting exhaust gas which flows from the exhaust-gas inlet (25) into the inlet channel (21) at an oblique angle with respect to an axial direction of the inlet channel (21) or with respect to the axis of a compressor (3), wherein the flow barrier (29) is suitable for diverting the inflowing exhaust gas into the axial direction of the inlet channel (21) to a compressor wheel (5) and extends as far as the side wall (23) of the inlet channel (21) in conjunction with the side wall (23) defines a passage facing toward the exhaust gas inlet (25), the passage is open in the axial direction of the inlet channel (21), is open on a side facing the compressor wheel (5), and is open on a side facing away from the compressor wheel (5), wherein the flow barrier (29) is suitable for conducting the exhaust gas substantially only through the passage and preventing mixing of the exhaust gas with the air flowing along a flow path on a side of the flow barrier (29) which is averted from the exhaust-gas inlet (25), wherein the flow barrier (29) extends into the housing (17), the flow barrier (29) is held in its position by the housing (17), the flow barrier (29) is inserted into at least one groove of the housing (17), and the flow barrier (29) extends in an axial direction substantially parallel to a longitudinal axis (19) across the exhaust-gas inlet (25) as far as the compressor wheel (5).

2. The compressor device as claimed in claim 1, wherein the flow barrier (29) extends substantially in the axial direction of the inlet channel (21) and perpendicular thereto.

3. The compressor device as claimed in claim 1,
wherein, in a cross-sectional area perpendicular to the axial direction of the inlet channel (21) in the region of the exhaust-gas inlet (25),
the flow barrier (29) surrounds a mouth cross-sectional region (37) adjacent to the exhaust-gas inlet (25) and separates said mouth cross-sectional region from a further cross-sectional region (39),
or the flow barrier (29) and the side wall (23) surround a mouth cross-sectional region (37) adjacent to the exhaust-gas inlet (25) and separate said mouth cross-sectional region from a further cross-sectional region (39).

4. The compressor device as claimed in claim 1,
wherein the flow barrier (29) has multiple walls (41) which each run from an intersection region (43) in the interior of the inlet channel (21) to the side wall (23).

5. The compressor device as claimed in claim 1,
wherein a wall thickness of the flow barrier (29) is significantly smaller than an extent of the flow barrier (29) in the axial direction of the inlet channel (21).

6. The compressor device as claimed in claim 1,
comprising a further exhaust-gas inlet (25) or a recirculation channel inlet (65) which is at least partially spanned by the flow barrier (29) which is spaced apart therefrom, wherein the flow barrier (29) is suitable for diverting exhaust gas which flows from the further exhaust-gas inlet (25) or from the recirculation channel inlet (65) into the inlet channel (21) at an angle with respect to the axial direction of the inlet channel (21) or with respect to the axis of the compressor.

7. The compressor device as claimed in claim 1, wherein the flow barrier (29) has means for generating turbulence in a gas flow flowing in the inlet channel (21) in the axial direction of the inlet channel (21) or in the direction of the axis of the compressor (3).

8. The compressor device as claimed in claim 1, wherein an insert (47) in an inlet (45) of the compressor (3) defines the side wall (23) and has the flow barrier (29).

9. The compressor device as claimed in claim 8, wherein the insert (47) is comprised by a connector region of an air feed pipe (59) and can be pushed or pressed, or has been pushed or pressed, into the inlet (45) of the compressor (3).

10. The compressor device as claimed in claim 1, wherein the flow barrier (29) is arranged in a connector region of an air feed pipe (59) and can be pushed or pressed, or has been pushed or pressed, into an inlet (45) of the compressor (3), such that the inlet (45) defines the side wall of the inlet channel (21).

11. The compressor device as claimed in claim 1, a compressor wheel (5) of which is connected via a shaft (11) to a turbine wheel (9), which can be driven by an exhaust-gas stream, and/or to an electric motor (15).

* * * * *